US007925046B2

(12) United States Patent
Rundle et al.

(10) Patent No.: US 7,925,046 B2
(45) Date of Patent: *Apr. 12, 2011

(54) IMPLICIT VIDEO CODING CONFIRMATION OF AUTOMATIC ADDRESS RECOGNITION

(75) Inventors: Alfred T. Rundle, Endwell, NY (US); Scott W. Breen, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 1014 days.

This patent is subject to a terminal disclaimer.

(21) Appl. No.: 11/743,392

(22) Filed: May 2, 2007

(65) Prior Publication Data

US 2008/0273749 A1    Nov. 6, 2008

(51) Int. Cl.
*G06K 9/00* (2006.01)
(52) U.S. Cl. .................. 382/101; 382/309; 209/584
(58) Field of Classification Search .......... 382/141, 382/101, 102, 218, 318, 112, 299, 173, 276, 382/312, 321, 309; 209/583, 584, 900, 939, 209/546; 235/462.08
See application file for complete search history.

(56) References Cited

U.S. PATENT DOCUMENTS

| | | | |
|---|---|---|---|
| 5,617,481 A | 4/1997 | Nakamura | |
| 5,910,998 A | 6/1999 | Yui | |
| 6,269,171 B1 * | 7/2001 | Gozzo et al. ............... | 382/101 |
| 6,327,373 B1 * | 12/2001 | Yura ........................... | 382/101 |
| 6,535,619 B1 | 3/2003 | Suwa et al. | |
| 6,587,572 B1 | 7/2003 | Suchenwirth-Bauersachs et al. | |
| 6,909,789 B1 | 6/2005 | Hänsel et al. | |
| 7,415,130 B1 * | 8/2008 | Rundle et al. ............. | 382/101 |
| 7,813,524 B2 * | 10/2010 | Keller et al. .............. | 382/101 |
| 2003/0044044 A1 | 3/2003 | Emanuelsson et al. | |
| 2004/0059462 A1 | 3/2004 | Norris et al. | |
| 2004/0120547 A1 | 6/2004 | Mampe et al. | |
| 2004/0146181 A1 | 7/2004 | Hänsel et al. | |
| 2005/0123170 A1 | 6/2005 | Desprez et al. | |

(Continued)

FOREIGN PATENT DOCUMENTS

DE    197 07 397 A1    8/1998

(Continued)

OTHER PUBLICATIONS

U.S. Appl. No. 12/120,891, filed May 2007, Rundle, Alfred T.*

(Continued)

*Primary Examiner* — Sheela C Chawan
(74) *Attorney, Agent, or Firm* — Miles & Stockbridge P.C.; James T. Carmichael; Stephen W. Aycock, II

(57) ABSTRACT

A method for sorting mail that may include performing an automatic address recognition process on a digitized image of a mail piece and generating a plurality of conditional address recognition results and a plurality of confirmation values each associated with one of the plurality of conditional address recognition results. The method can include sending the digitized image, the plurality of conditional address recognition results and the plurality of confirmation values to a video coding system, and selecting a video coding task corresponding to one or more of the plurality of confirmation values. The method can include comparing a video coding result with each of the plurality of confirmation values and, if one of the plurality of confirmation values matches the video coding result, then selecting a confirmed address recognition result from the plurality of conditional address recognition results, the confirmed address recognition result being associated with the confirmation value matching the video coding result.

15 Claims, 7 Drawing Sheets

U.S. PATENT DOCUMENTS

2005/0180661 A1 8/2005 El Bernoussi et al.
2005/0249376 A1 11/2005 Leo et al.

FOREIGN PATENT DOCUMENTS

| DE | 197 48 702 C1 | 11/1998 |
| JP | 9-161003 | 6/1997 |
| JP | 2000-262986 | 9/2000 |
| JP | 2003-300021 | 10/2003 |
| WO | WO 2004/027673 A1 | 4/2004 |

OTHER PUBLICATIONS

A. Benedetti et al., "Confidence computation improvement in an optical field reading system: Abstract", Fourth International Conference Document Analysis and Recognition, ICDAR '97, p. 836.

"Distribution Technology in the Postal Service Past, Present and Future"; source: http:www.treasury.gov/offices/domestic-finance/usps/testimony-docs/Day.pdf, Mar. 13, 2003.

* cited by examiner

IMPLICIT VIDEO CODING CONFIRMATION OF AUTOMATIC ADDRESS RECOGNITION

Embodiments of the present invention relate generally to automated mail sorting and, more particularly, to sorting mail pieces using implicit video coding confirmation of automatic address recognition results.

Conventional automated mail sorting equipment may include an automatic address recognition system for reading addresses contained in mail piece images. If the automatic address recognition system is unable to resolve a destination address from a mail piece image, the automatic address recognition system may reject the mail piece image. Mail piece images rejected by the automatic address recognition system may be sent to a video coding system (VCS), in which one or more human operators manually resolves a destination address and/or other information contained in the rejected mail piece images. In some systems, the VCS may provide a "hint", such as a ZIP code or a partial address string for use by the automatic address recognition system. The hint and the rejected mail piece image may be provided as input to the automatic address recognition system so that the automatic address recognition system may be re-dispatched for a second attempt to resolve the destination address contained in a rejected mail piece image.

The re-dispatching of the automatic address recognition process may represent a limitation of conventional systems and may result in processing inefficiencies, increased computation cost, and/or increased processing latency, which may impact the timeliness of online address resolution. Also, sending rejected mail pieces from the automatic address recognition system to the VCS in order to generate hints may entail a special task for a VCS operator. Handling of this special task may include dedicating a portion of the labor resources in a VCS to the special task or interrupting a normal task workflow of a VCS operator to handle the special task. Interrupting the VCS operator with the special task may reduce VCS operator productivity and may increase training costs because the normal workload and rhythm may be interrupted by having to intermittently switch tasks. Embodiments of the present invention may address the above-mentioned problems and limitations, among other things.

An embodiment can include a method for sorting mail including performing an automatic address recognition process on a digitized image of a mail piece and generating a plurality of conditional address recognition results and a plurality of confirmation values each associated with one of the plurality of conditional address recognition results. The method can include sending the digitized image, the plurality of conditional address recognition results and the plurality of confirmation values to a video coding system, and selecting a video coding task corresponding to one or more of the plurality of confirmation values. The method can include comparing a video coding result with each of the plurality of confirmation values and, if one of the plurality of confirmation values matches the video coding result, then selecting a confirmed address recognition result from the plurality of conditional address recognition results, the confirmed address recognition result being associated with the confirmation value matching the video coding result.

Another embodiment may include a mail sorting system including an automatic address recognition module and a video coding system coupled to the automatic address recognition module. The video coding system can receive a conditional result and a confirmation value generated by the automatic address recognition module. The automatic address recognition module can include a memory having software instructions that when executed cause the address recognition system to perform steps including performing an automatic address recognition process on a digitized image of a mail piece, generating a conditional address recognition result and a confirmation value each associated with the conditional address recognition result, and sending the conditional address recognition results and the confirmation values to the video coding system. The video coding system can include a memory having software instructions stored therein that when executed cause the video coding system to perform steps including selecting a video coding task corresponding to one or more of the confirmation values and comparing a video coding result with the plurality of confirmation values. If one of the confirmation values matches the video coding result, then the associated conditional address recognition result may be selected as a confirmed address recognition result.

Another embodiment includes a computer program product including software instructions for enabling a computer to perform predetermined operations; and a computer readable medium bearing the software instructions. The predetermined operations including the steps of performing an automatic address recognition process on a digitized image of a mail piece and generating a conditional address recognition result and a confirmation value associated with the conditional address recognition result on the basis of an uncertainty resulting from the automatic address recognition process. The steps can also include sending the conditional address recognition result and the confirmation value to a video coding system and selecting a video coding task corresponding to the confirmation value. The steps can also include comparing a video coding result with the confirmation value, and, if the confirmation value matches the video coding result, then selecting the conditional address recognition result as a confirmed address recognition result.

DETAILED DESCRIPTION

In general, at least one embodiment can resolve an address from a low confidence automatic recognition result using implicit video coding confirmation. The term "implicit video coding confirmation," as used herein, refers to sending one or more conditional automatic address recognition results and one or more corresponding confirmation values to a video coding system for confirmation. The confirmation is termed "implicit" because confirmation values, used by software to confirm a conditional result, may be provided along with the conditional results and the confirmation of the conditional result can be transparent to a video coding operator. Based on a comparison of a result of video coding and a confirmation value, software can automatically resolve the address, which can include one of the conditional results that corresponds to the confirmation value, without a need for additional video coding tasks or re-dispatching an automatic address recognition system task. Because standard video coding tasks can be used for confirmation (as opposed to special tasks), embodiments can be incorporated relatively easily into an existing mail sorting apparatus having an automatic address recognition system and a video coding system.

The exemplary VCS described in conjunction with the various embodiments below may include a sequential address coding sequence including last line coding and street coding. Last line coding can include resolving an address to a 5-digit ZIP code, for example by an operator keying (or otherwise coding, for example, using a mouse or a speech recognition system) the 5-digit ZIP code and/or a portion of the locality, or city, text. Street coding can include resolving the address to a a finer depth such as mail carrier (e.g., walk) or delivery point, for example by an operator coding range (e.g., house number) characters and a portion of the street name. The exemplary VCS can also have a region of interest (ROI) coding task, which may include an operator using a mouse to identify coordinates of the address block in the mail piece image. ROI identification may also be accomplished through by an operator using a mouse to select an upper left corner of an address block and dragging a cursor to a lower right corner of the block. Also, ROI identification may be accomplished by having highlighted blocks on a screen from which an operator selects one using a mouse. Alternatively, the highlighted blocks may be numbered and an operator may select one by keying/coding in the corresponding number associated with the block being selected.

Figure 1:
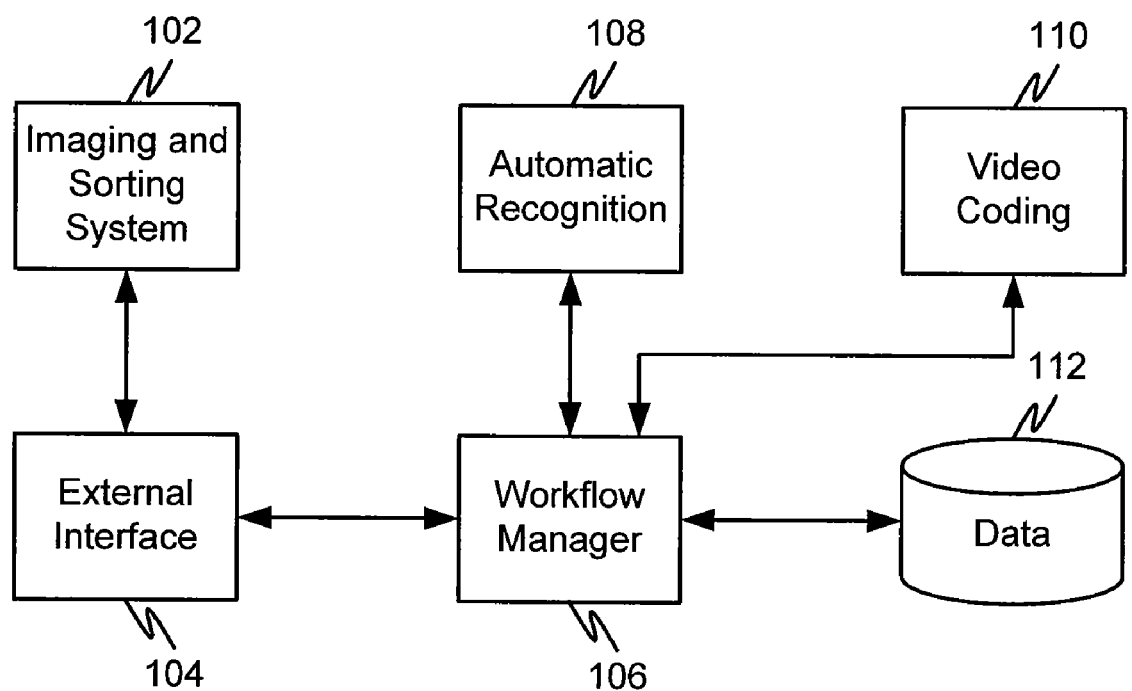
FIG. 1 provides a block diagram illustration of an exemplary mail sorting system including an automatic address recognition system with implicit video coding confirmation in accordance with at least one embodiment.

FIG. 1 provides a block diagram illustration of an exemplary mail sorting system including an automatic address recognition system with implicit video coding confirmation in accordance with at least one embodiment. In particular, a mail sorting system 100 can include and imaging and sorting system 102, an external interface 104, a workflow manager 106, an automatic recognition unit 108, a video coding system 110, and a database 112.

The imaging and sorting system 102 can include the electronics and machinery used to transport mail pieces, generate an image of each mail piece, and sort each mail piece according to its destination or other criteria. For example, the imaging and sorting system 102 can be used to generate an image of a mail piece. The image may be received by the external interface 104, which can provide an interface between the workflow manager 106 and the imaging and sorting system 102. The image may be received by the workflow manager 106 and sent to the automatic recognition unit 108. The automatic recognition unit 108 may attempt to automatically recognize information in the mail piece image, such as destination address, return address, postage, barcodes, and/or other information.

If the automatic recognition unit 108 has difficulty reading a portion of the mail piece image, for example, the destination address, then the image may be sent to the video coding system 110 along with one or more conditional results and associated confirmation values. The automatic recognition unit 108 may communicate with the video coding system 110 either indirectly (through the workflow manager 106) or directly. Software in the video coding system 110 or the workflow manager 106 can be used to confirm a conditional result. Once a conditional result is confirmed, the processing of the mail piece may continue without a need to repeat automatic recognition or a need to perform further video coding tasks.

The video coding system 110 can include human operators that view an image and enter some or all of the information contained in the image. The video coding results may then be used to confirm a conditional result, which may then be used to resolve any ambiguity or uncertainty regarding the destination address, or other information in the mail piece image. Data generated by the automatic recognition processes and video coding processes may be stored in the database 112.

Figure 2:
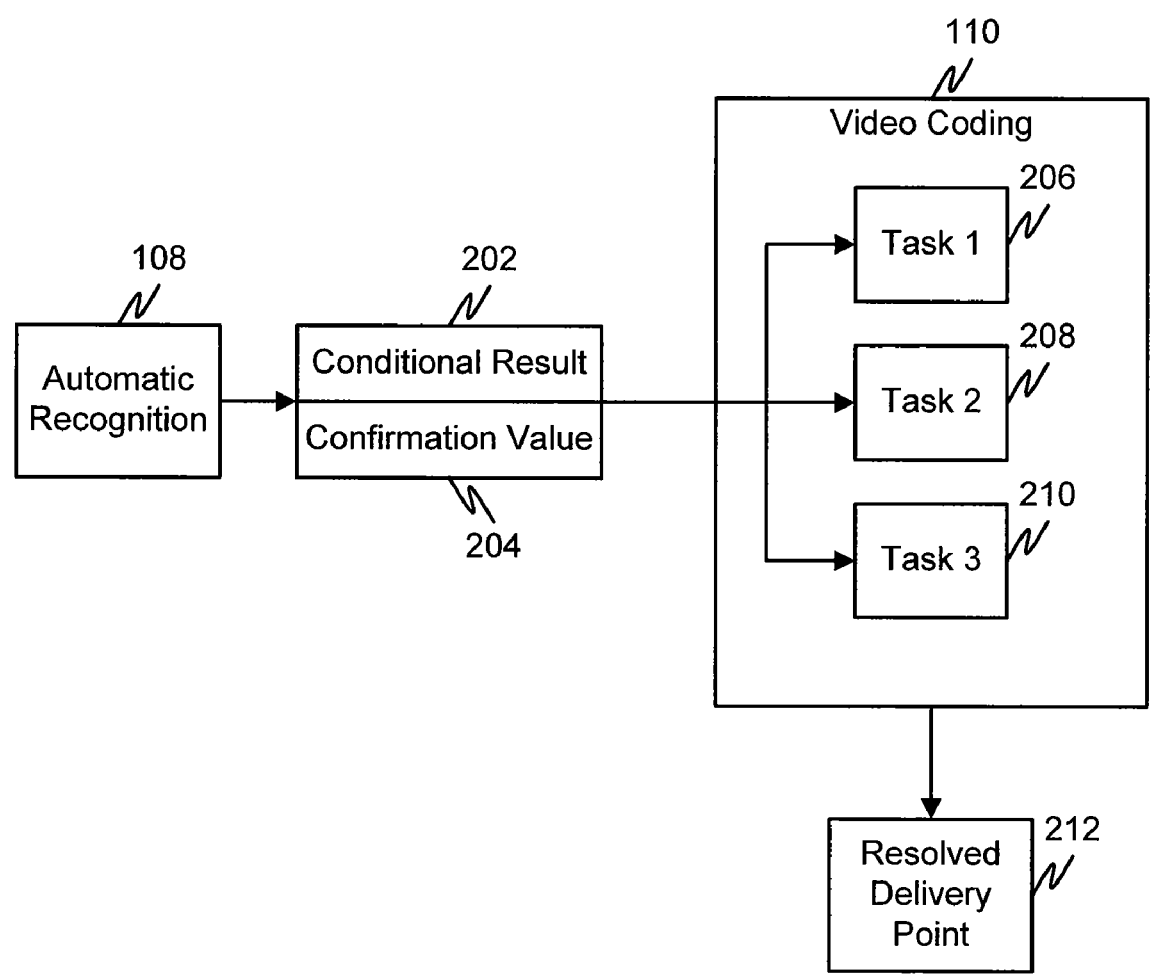
FIG. 2 provides a block diagram illustration of an exemplary automatic address recognition system and video coding system in accordance with at least one embodiment.

FIG. 2 provides a block diagram illustration of an exemplary automatic address recognition system and video coding system in accordance with at least one embodiment. In particular, the automatic recognition unit 108, while attempting address recognition on a mail piece image, may encounter some uncertainty. The automatic recognition unit can send a conditional result 202 and an associated confirmation value 204 to the video coding system 110, along with the mail piece image.

The video coding system may include a plurality of operators performing certain tasks (206-210). The image and conditional result/confirmation value may be directed to a video coding task that corresponds to the portion of the address that the automatic recognition unit 108 had trouble resolving. By sending a mail piece image (not shown) and a conditional result 202/confirmation value 204 to a selected video coding task (206, 208, and/or 210), the video coding system may be able to resolve an ambiguity or uncertainty from the automatic recognition process and generate, for example, a resolved delivery point 212. A level of resolution to a depth of sort other than delivery point, such as, for example, mail carrier or walk, could be generated. If the video coding system is not able to confirm a conditional result, then full video coding may be used to resolve an uncertainty.

Figure 3:
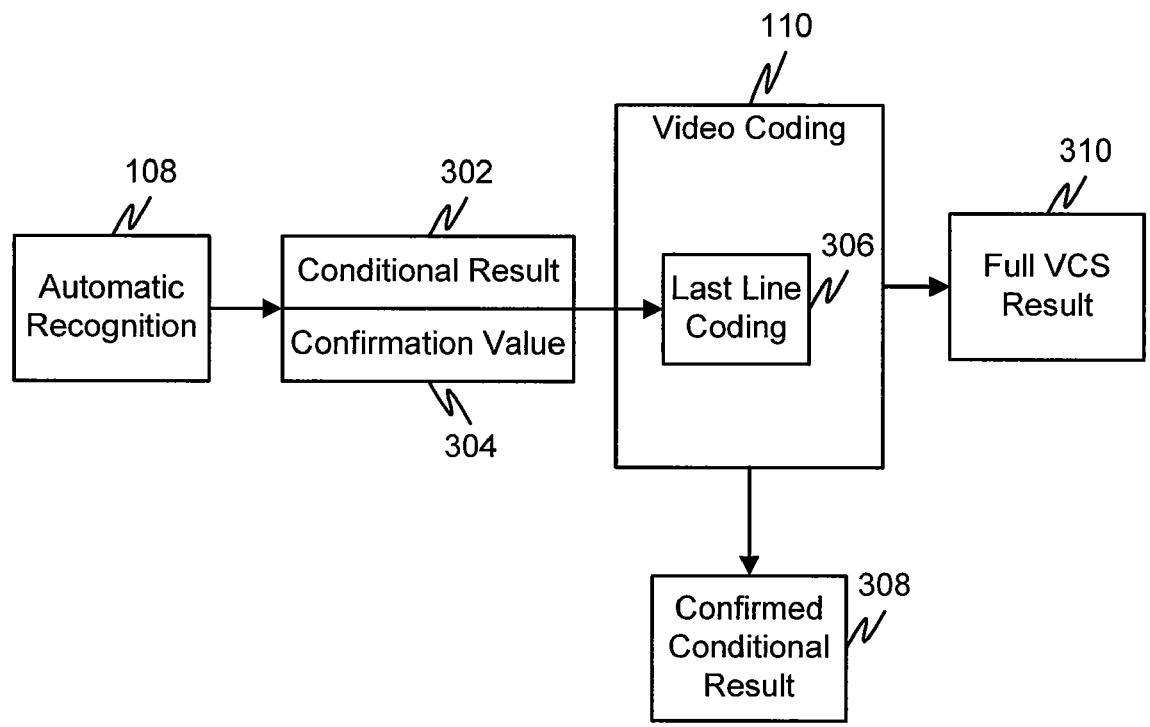
FIG. 3 provides a block diagram illustration of a dataflow in an exemplary embodiment including a single conditional result and corresponding confirmation value.

FIG. 3 provides a block diagram illustration of a dataflow in an exemplary embodiment including a single conditional result and corresponding confirmation value. In particular, the automatic recognition unit 108, while attempting address recognition on a mail piece image, may encounter some uncertainty. The automatic recognition unit 108 can send a conditional result 302 and an associated confirmation value 304 to the video coding system 110, along with the mail piece image (not shown). In this example, the video coding system 110 includes a last line coding task 306. The video coding system 110, after processing as described below, may output as a result a confirmed conditional result 308 or a full video coding system (VCS) result 310.

For example, the automatic recognition system 108 may have processed two address blocks in the mail piece image, but may be uncertain as to which is the destination address block. The automatic recognition unit may have a first choice for the destination address having a delivery point ZIP code of 13760-1537-26. The second choice may have only been resolved to a 5-digit ZIP such as 13827. Thus, the automatic recognition unit 108 may send a conditional result having a value of 13760-1537-26 and a confirmation value of 13760 to the video coding system with a request for "Full Address Coding," the first step of which is last-line coding 306. The video coding operator performing the last line coding task may enter the 5-digit zip code as the first step. The system may then compare the video coding result, for example 13760, to the confirmation value. If the two match, then no further video coding is necessary because the conditional result from the automatic recognition system identified the destination down to an 11-digit delivery point code. By matching the confirmation value, the video coder has in effect confirmed the first choice of the automatic recognition unit 108. Thus, no further keystrokes by the video coding operator may be needed and no further automatic recognition may be needed. The mail piece image can then be removed from the video coding workflow and sorted according to the confirmed conditional result 308.

However, if the video coder had entered a result that did not match the confirmation value, for example 13827, the video coding process may continue as normal with a street coding step in order to complete resolution of the address and a full video coding system result 310 may be output as the resolved address. Optionally, automatic recognition may be re-dispatched using the 5-digit ZIP from last line coding as a hint.

Figure 4:
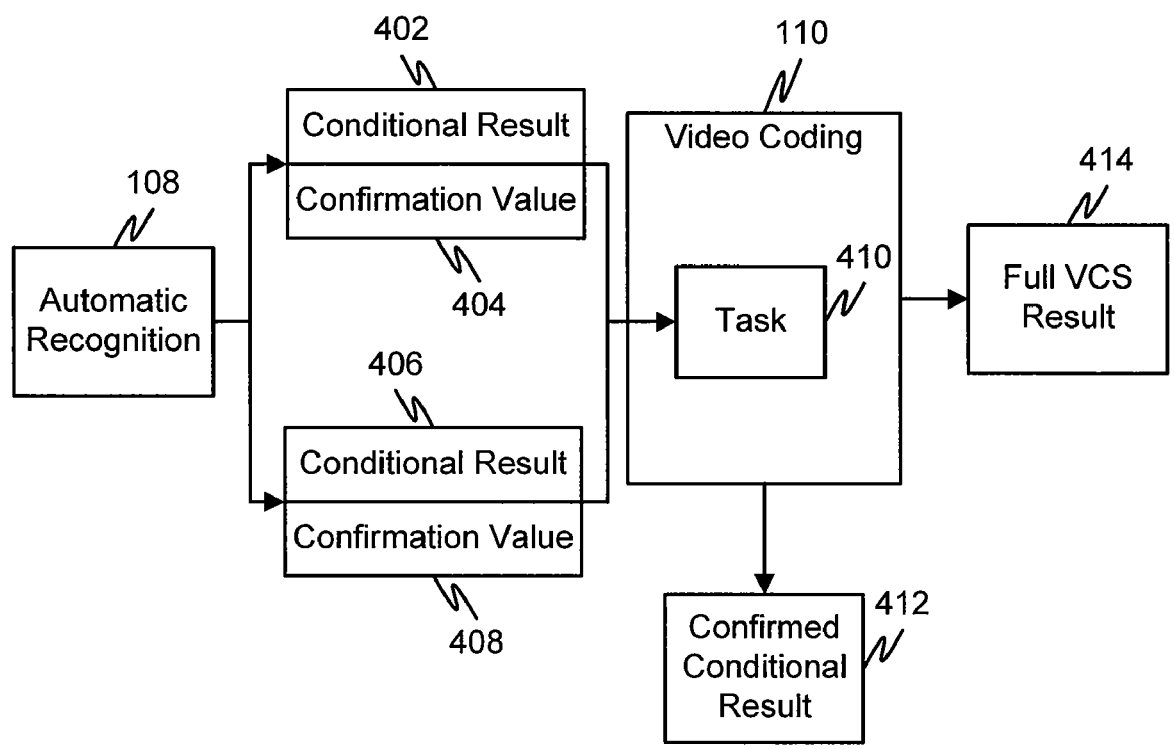
FIG. 4 provides a block diagram illustration of a dataflow in an exemplary embodiment including multiple conditional results and corresponding confirmation values.

FIG. 4 provides a block diagram illustration of a dataflow in an exemplary embodiment including multiple conditional results and corresponding confirmation values. In particular, the automatic recognition unit 108, while attempting address recognition on a mail piece image, may encounter some uncertainty. The automatic recognition unit 108 can send a plurality of conditional results including a first conditional result 402 and an associated first confirmation value 404, and a second conditional result 406 and an associated second confirmation value 408, to the video coding system 110, along with the mail piece image (not shown) for confirmation. In this example, the video coding system 110 includes a task 410. The video coding system 110, after processing as described below, may output as a result a confirmed conditional result 412 or a full video coding system (VCS) result 414.

For example, the automatic recognition unit 108 may have uncertainty regarding which of two address blocks in a mail piece image is the destination address block. The automatic recognition unit 108 may have resolved both address blocks to their respective delivery point codes (or other depth of sort criteria) and can present both delivery point codes to the video coding system as conditional results (402 and 406). For example, the first conditional result 402 could be 13760-1537-26 and have an associated first confirmation value of 13760; and the second conditional result could be 13827-3998 and have an associated confirmation value of 13827.

If a result of the last line coding task 410 in the video coding system 110 is either 13760 or 13827, then software can select the associated conditional result as the delivery point and no further video coding or automatic recognition may be needed.

If, however, the video coding result was other than one of the two conformation values, then the normal video coding process may continue to produce a full video coding result 414, or automatic recognition may be re-dispatched using a hint from the video coder.

Figure 5:
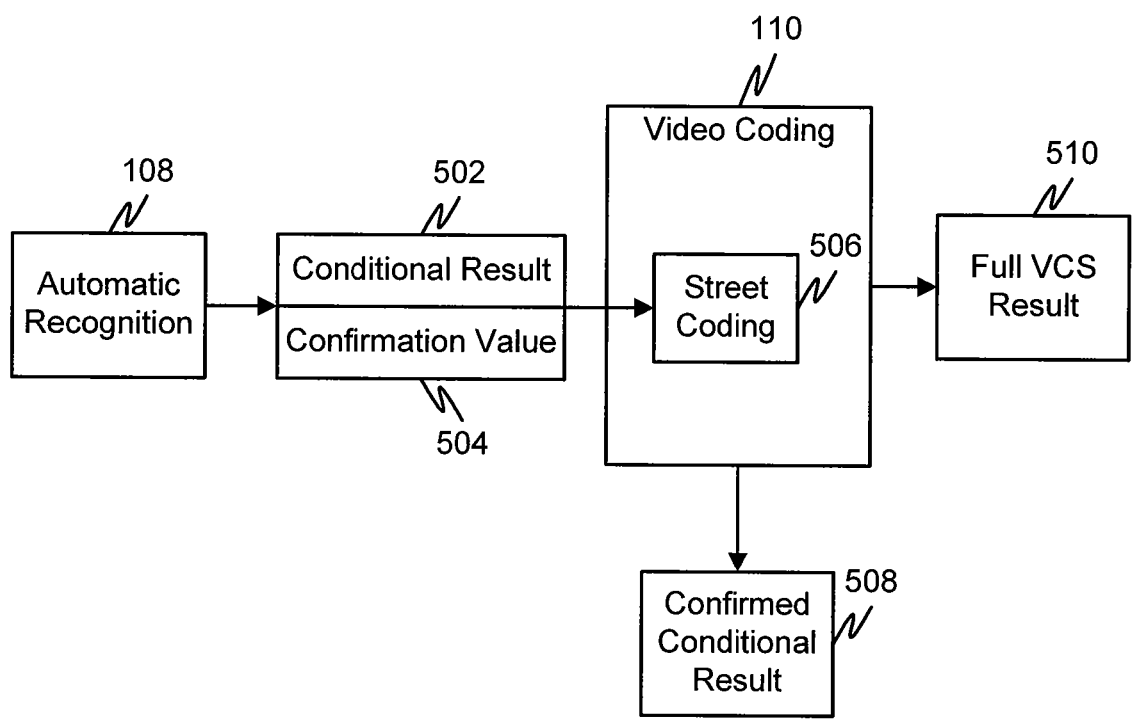
FIG. 5 provides a block diagram illustration of a dataflow in an exemplary embodiment including a single conditional result and corresponding confirmation value.

FIG. 5 provides a block diagram illustration of a dataflow in an exemplary embodiment including a single conditional result and corresponding confirmation value. In particular, the automatic recognition unit 108, while attempting address recognition on a mail piece image, may encounter some uncertainty. The automatic recognition unit 108 can send a conditional result 502 and an associated confirmation value 504 to the video coding system 110, along with the mail piece image (not shown). In this example, the video coding system 110 includes a street coding task 506. The video coding system 110, after processing as described below, may output as a result a confirmed conditional result 508 or a full video coding system (VCS) result 510.

For example, the automatic recognition system 108 may have achieved a low confidence candidate primary delivery address based on weak confidence in a building number and/or street name. However, the automatic recognition unit 108 has achieved a high confidence on the interpretation of the top line of the address (e.g. apartment number, suite, firm name, individual name, or the like) based on the candidate primary delivery address. The address can be resolved to a finer depth of sort by using video coding to confirm building and street number. For example, the conditional result maybe 13827-3998 with an associated confirmation value of 13827-3900-01. Thus, the automatic recognition unit 108 may send a conditional result having a value of 13827-3998 and a confirmation value of 13827-3900-01 to the video coding system with a request for "Street Coding" 506. The video coding operator performing the street coding task may enter the building number and/or street name. The system may then generate a resulting ZIP code and compare the ZIP code to the confirmation value. If the two match, then no further video coding is necessary because the conditional result from the automatic recognition system identified the destination down to an 11-digit delivery point code (or other depth of sort). Thus, no further keystrokes by the video coding operator may be needed and no further automatic recognition may be needed. The mail piece image can then be removed from the video coding workflow and sorted according to the confirmed conditional result 508.

However, if the video coder had entered a result that did not match the confirmation value, for example 13827-3900-03, the video coding process may continue as normal with a street coding step in order to complete resolution of the address and a full video coding system result 510 may be output as the resolved address. Optionally, automatic recognition may be re-dispatched using the 5-digit ZIP from last line coding as a hint.

Figure 6:
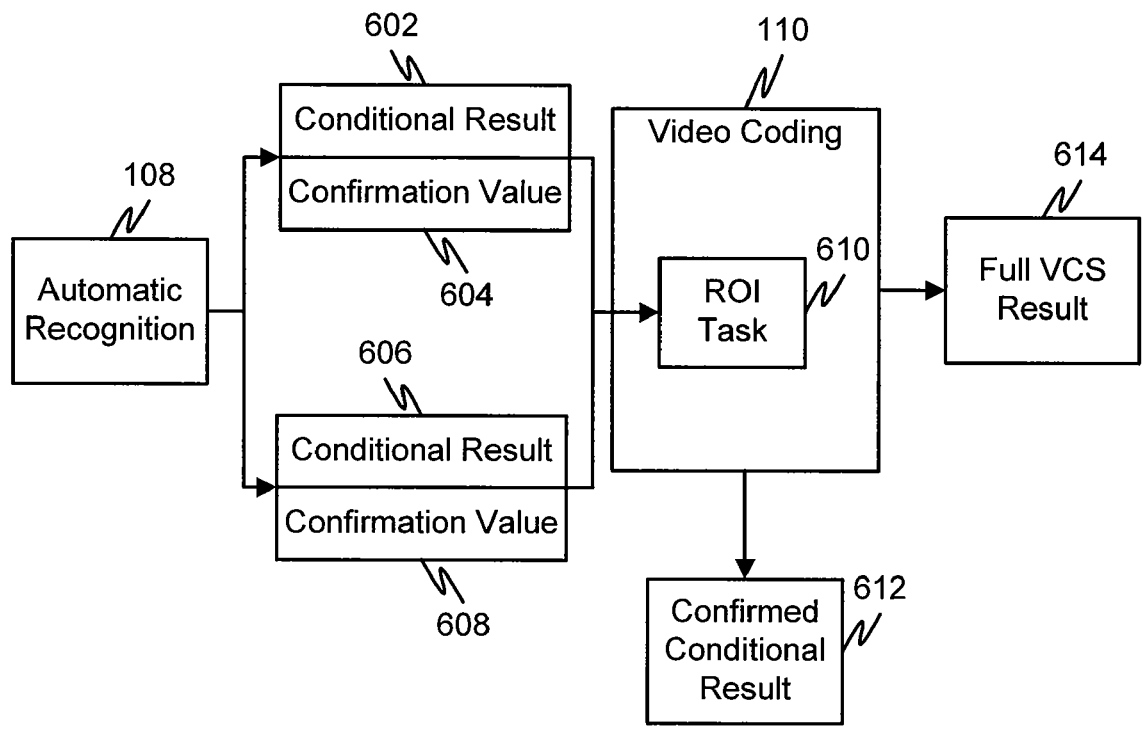
FIG. 6 provides a block diagram illustration of a dataflow in an exemplary embodiment including multiple conditional results and corresponding confirmation values.

FIG. 6 provides a block diagram illustration of a dataflow in an exemplary embodiment including multiple conditional results and corresponding confirmation values. In particular, the automatic recognition unit 108, while attempting address recognition on a mail piece image, may encounter some uncertainty. The automatic recognition unit 108 can send a plurality of conditional results including a first conditional result 602 and an associated first confirmation value 604, and a second conditional result 606 and an associated second confirmation value 608, to the video coding system 110, along with the mail piece image (not shown) for confirmation. In this example, the video coding system 110 includes a region of interest (ROI) task 610. The video coding system 110, after processing as described below, may output as a result a confirmed conditional result 612 or a full video coding system (VCS) result 614.

For example, the automatic recognition unit 108 may have resolved address from two address block in a mail piece image, but may be uncertain as to which is the destination address block. The automatic recognition unit 108 may send a ZIP code of 13760-1537-26 as the first conditional result 602 and coordinates of X1, Y1, X2, Y2 as the first confirmation value 604; and a ZIP code of 13827-3998 as the second conditional result 606 and coordinates of X3, Y3, X4, Y4 as the second confirmation value 608. The automatic recognition unit 108 may request an ROI task 610 from the video coding system 110.

If the ROI task 610 result coordinates match, within a tolerance, those of either confirmation value coordinates, then the conditional result associated with the matching coordinates can be output as the confirmed conditional value. If, however, the video coding result was does not match one of the two conformation values, then the normal video coding process may continue to produce a full video coding result 614, or automatic recognition may be re-dispatched using a hint from the video coder, such as the coordinates of the destination address block as identified by the video coding task 610.

Figure 7:
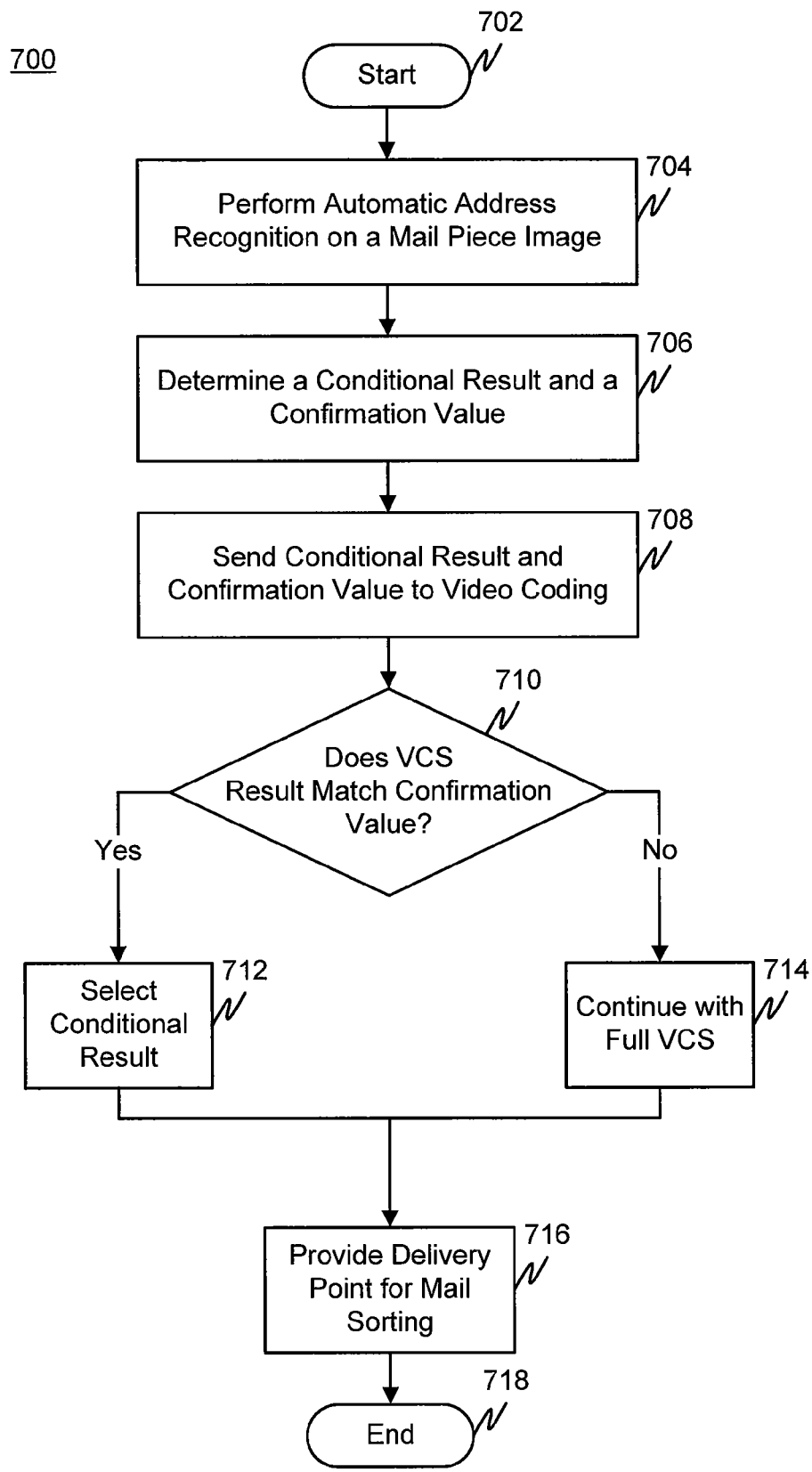
FIG. 7 provides a flowchart of an exemplary method of automatic address recognition with implicit video coding confirmation in accordance with at least one embodiment.

FIG. 7 provides a flowchart 700 of an exemplary method of automatic address recognition with implicit video coding confirmation in accordance with at least one embodiment. Processing begins at step 702 and continues to 704.

In step 704, automatic address recognition is attempted on a mail piece image. The automatic recognition process may result in some ambiguity or uncertainty, such as resolving a destination address to a delivery point code or a carrier walk depth. Control continues to step 706.

In step 706, a conditional result and a confirmation value associated with the conditional result are determined. For example, the conditional result may comprise a delivery point code and the confirmation value can include a 5-digit ZIP code. It should be appreciated that more than one pair of conditional results and associated confirmation values may be used. Control continues to step 708.

In step 708, the conditional result and associated confirmation value are sent to video coding for confirmation. The mail piece image can also be sent to video coding for use in confirming the conditional result. Control continues to step 710.

In step 710, a result from the video coding system (VCS) is compared to the confirmation value. If the VCS result matches the confirmation value, then control continues to step 712. If, however, the VCS result does not match the confirmation value, then control continues to step 714.

In step 712, the conditional result is confirmed and selected as the result of the task. For example, if the video coder codes a sequence matching a 5-digit ZIP confirmation value, then a conditional result including a delivery point code associated with the confirmation value may be selected as the result. The mail piece may then be sorted according to the confirmed conditional value. It should be appreciated that sortation to depths other than delivery point may be used, such as, for example, carrier walk. Control continues to step 716.

In step 714, the video coding sequence may continue and a result of the video coding process may be output, for example, a delivery point code. Control continues to step 716.

In step 716, the destination sort result, such as delivery point code, from confirmation of automatic recognition results or of the full VCS process may be provided for mail sorting. Control continues to step 718 where the sequence ends.

It should be appreciated that steps 702-718 may be repeated in whole or in part in order to perform a contemplated mail sorting task. Further, it should be appreciated that the steps mentioned above may be performed on a single or distributed processor. Also, the processes, modules, and units described in the various figures of the embodiments above may be distributed across multiple computers or systems or may be co-located in a single processor or system.

Embodiments of the method, system and computer program product for implicit video coding confirmation of automatic address recognition, may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic device such as a PLD, PLA, FPGA, PAL, or the like. In general, any process capable of implementing the functions or steps described herein can be used to implement embodiments of the method, system, or computer program product for implicit video coding confirmation of automatic address recognition.

Furthermore, embodiments of the disclosed method, system, and computer program product for implicit video coding confirmation of automatic address recognition may be readily implemented, fully or partially, in software using, for example, object or object-oriented software development environments that provide portable source code that can be used on a variety of computer platforms. Alternatively, embodiments of the disclosed method, system, and computer program product for implicit video coding confirmation of automatic address recognition can be implemented partially or fully in hardware using, for example, standard logic circuits or a VLSI design. Other hardware or software can be used to implement embodiments depending on the speed and/or efficiency requirements of the systems, the particular function, and/or a particular software or hardware system, microprocessor, or microcomputer system being utilized. Embodiments of the method, system, and computer program product for implicit video coding confirmation of automatic address recognition can be implemented in hardware and/or software using any known or later developed systems or structures, devices and/or software by those of ordinary skill in the applicable art from the functional description provided herein and with a general basic knowledge of the computer, mail sorting, and optical character recognition arts.

Moreover, embodiments of the disclosed method, system, and computer program product for implicit video coding confirmation of automatic address recognition can be implemented in software executed on a programmed general-purpose computer, a special purpose computer, a microprocessor, or the like. Also, the implicit video coding confirmation of automatic address recognition method of this invention can be implemented as a program embedded on a personal computer such as a JAVA® or CGI script, as a resource residing on a server or graphics workstation, as a routine embedded in a dedicated processing system, or the like. The method and system can also be implemented by physically incorporating the method for implicit video coding confirmation of automatic address recognition into a software and/or hardware system, such as the hardware and software systems of mail sorting or automatic address recognition system equipment.

It is, therefore, apparent that there is provided in accordance with the present invention, a method, system, and computer program product for implicit video coding confirmation of automatic address recognition. While this invention has been described in conjunction with a number of embodiments, it is evident that many alternatives, modifications and variations would be or are apparent to those of ordinary skill in the applicable arts. Accordingly, applicants intend to embrace all such alternatives, modifications, equivalents and variations that are within the spirit and scope of this invention.

What is claimed is:

1. A method for sorting mail comprising:
    performing an automatic address recognition process on a digitized image of a mail piece;
    generating a plurality of conditional address recognition results and a plurality of confirmation values each associated with one of the plurality of conditional address recognition results;
    sending the digitized image, the plurality of conditional address recognition results and the plurality of confirmation values to a video coding system;
    selecting a video coding task corresponding to one or more of the plurality of confirmation values;

comparing a video coding result with each of the plurality of confirmation values; and if one of the plurality of confirmation values matches the video coding result, then selecting a confirmed address recognition result from the plurality of conditional address recognition results, the confirmed address recognition result being associated with the confirmation value matching the video coding result.

2. The method of claim 1, wherein the plurality of conditional address recognition results are each associated with a confirmation value corresponding to an uncertain result from an automatic address recognition process.

3. The method of claim 1, further comprising:

completing a video coding process if one of the plurality of confirmation values does not match the video coding result.

4. The method of claim 1, wherein the video coding task is selected from the group of last line coding, street coding, and region of interest coding.

5. The method of claim 1, further comprising sorting the mail piece according to the confirmed address recognition result.

6. The method of claim 1, wherein sending the digitized image, the plurality of conditional address recognition results and the plurality of confirmation values to a video coding system includes using a workflow manager to communicate with the video coding system.

7. A mail sorting system comprising:

a processor;

an automatic address recognition module;

a video coding system coupled to the automatic address recognition module, the video coding system receiving a conditional result and a confirmation value generated by the automatic address recognition module;

wherein the automatic address recognition module includes a memory having encoded thereon software instructions that when executed cause the processor, to perform steps comprising:

performing an automatic address recognition process on a digitized image of a mail piece;

generating a conditional address recognition result and a confirmation value associated with the conditional address recognition result;

sending the conditional address recognition result and the confirmation value to the video coding system;

wherein the video coding system includes a memory having software instructions encoded thereon that when executed cause, a processor to perform steps comprising:

selecting a video coding task corresponding to the confirmation value;

comparing a video coding result with the confirmation value; and wherein if the confirmation value matches the video coding result, then selecting the conditional address recognition result as a confirmed address recognition result.

8. A computer program product comprising:

a non-transitory computer readable medium encoded with software instructions that, when executed by a computer, cause the computer to perform predetermined operations, the predetermined operations including the steps of:

performing an automatic address recognition process on a digitized image of a mail piece;

generating a conditional address recognition result and a confirmation value associated with the conditional address recognition result on the basis of an uncertain result from the automatic address recognition process;

sending the conditional address recognition result and the confirmation value to a video coding system;

selecting a video coding task corresponding to the confirmation value;

comparing a video coding result with the confirmation value; and if the confirmation value matches the video coding result, then selecting the conditional address recognition result as a confirmed address recognition result.

9. The computer program product of claim 8, wherein the computer is configured to be part of a mail sorting apparatus.

10. The computer program product of claim 8, wherein the steps further comprise:

completing a video coding process if the confirmation value does not match the video coding result.

11. The computer program product of claim 8, wherein the video coding task is selected from the group consisting of last line coding, street coding, and region of interest coding.

12. The computer program product of claim 8, wherein the steps further comprise sorting the mail piece according to the confirmed address recognition result.

13. The computer program product of claim 8, wherein sending the conditional address recognition result and the confirmation value to a video coding system includes sending the digitized image and using a workflow manager to communicate with the video coding system.

14. The computer program product of claim 8, wherein the steps further include generating an additional conditional address recognition result and an additional confirmation value associated with the additional conditional address recognition result on the basis of the uncertainty resulting from the automatic address recognition process.

15. The computer program product of claim 14, wherein the selecting a video coding task corresponding to the uncertainty further includes presenting the digitized image to a video coding operator and receiving information from the video coding operator without disrupting a workflow of the video coding operator.

* * * * *